Oct. 8, 1963

J. B. KOHLER 3,106,360

METHOD OF AND APPARATUS FOR SPLICING WEB ROLLS

Filed July 18, 1956

Inventor
John B. Kohler by Parker & Carter
Attorneys

Inventor
John B. Kohler by Parker & Carter
Attorneys

Inventor
John B. Kohler by Parker & Carter
Attorneys

Oct. 8, 1963   J. B. KOHLER   3,106,360
METHOD OF AND APPARATUS FOR SPLICING WEB ROLLS
Filed July 18, 1956   7 Sheets-Sheet 4

Inventor
John B. Kohler by Parker & Carter
Attorneys

Oct. 8, 1963

J. B. KOHLER 3,106,360

METHOD OF AND APPARATUS FOR SPLICING WEB ROLLS

Filed July 18, 1956

Inventor
John B. Kohler by Parker & Carter
Attorneys

Inventor
John B. Kohler
by Parker & Carter
Attorneys

United States Patent Office 3,106,360
Patented Oct. 8, 1963

3,106,360
METHOD OF AND APPARATUS FOR
SPLICING WEB ROLLS
John B. Kohler, 71 Woodstock St., Crystal Lake, Ill.
Filed July 18, 1956, Ser. No. 598,568
5 Claims. (Cl. 242—58.3)

This invention relates to feed mechanisms for machines handling, printing on, or otherwise treating webs, such as webs of paper, and has for one purpose to provide for replacement of feed rolls without interruption of the treating process.

Another purpose is to provide an unwinder mechanism capable of splicing a new roll onto a moving web without the necessity for moving either the feeding roll or the replacement roll.

Another purpose is to provide an unwinder mechanism wherein spindles or reels of paper, and the like, are retained in fixed position and splicing operations are accomplished by positioning a moving web.

Another purpose is to provide an unwinder mechanism capable of unwinding or feeding rolls of paper as they come from the paper-making machine and avoiding the necessity of transferring the paper to any special form of spindle or core or for rewinding portions of defective rolls while at the same time insuring a constant feed of a web to the web-treating machinery.

Another purpose is to provide an unwinder mechanism capable of employing rolls of paper and the like having breaks without the necessity of interrupting the feeding operation.

Other purposes will appear from time to time during the course of the specification and claims.

I illustrate my invention more or less diagrammatically in the accompanying drawings, wherein.

Like parts are indicated by like numerals throughout the specification and drawings.

Figure 1:
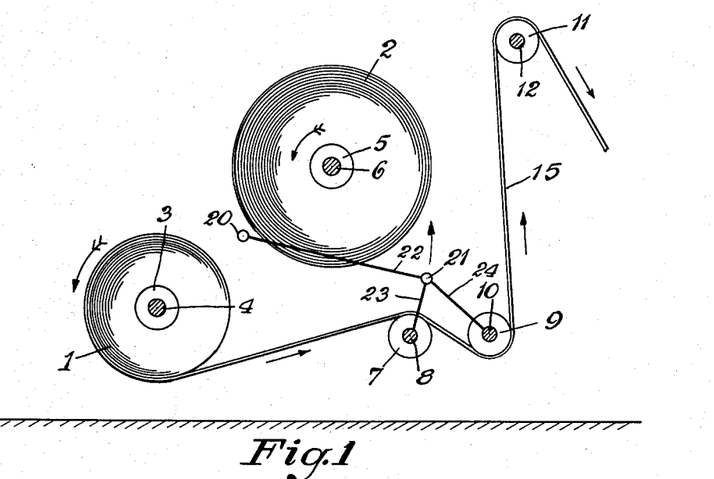
FIG. 1 is a side elevation illustrating diagrammatically the unwinder mechanism of my invention with the parts is position to feed a web from one reel.

Referring now to the drawings, and particularly to FIG. 1, I illustrate generally, and more or less diagrammatically, a first roll by the numeral 1. A second roll is indicated generally by the numeral 2. While, for convenience, the rolls 1 and 2 shall be referred to herein as rolls of paper, it will be understood that my invention is applicable to the feeding of webs of various substances and that the rolls and web discussed herein may be composed of a variety of substances without departing from the nature and scope of my invention.

A reel for roll 1 may be formed of a core 3 and a shaft 4. Similarly, a reel for roll 2 may be formed of a core 5 and a shaft 6. A splicing or pressure roller is indicated at 7 and may have a shaft 8. A web-directing or idler roller 9 may be rotatable about or on a shaft 10. A feed roller 11 may carry, or be mounted upon, a shaft 12. The web fed about the rollers 7, 9 and 11 from either of the rolls 1, 2 is designated generally by the numeral 15. It will be understood that the rolls 1, 2 are rotated in the direction of the arrows shown in FIG. 1, and that the web 15 is fed to the processing machinery in the direction of the arrows shown in FIG. 1 alongside the web 15.

The numeral 20 illustrates a center of rotation about which the rollers 7, 9 are rotated in accordance with my invention as further discussed hereinbelow. Similarly, the numeral 21 illustrates a center about which the roller 7 is moved for the purposes set forth below. It will be observed that the center 21 is rotated about the center 20, as shown in FIGS. 1 through 10, and that the roller 7 is rotated about the center 21 as indicated particularly in FIGS. 1–3 and 5–7. The roller 9 remains in a set position with respect to the center 21 and rotates with it about the center 20. As is clear from the drawings, the rotation of the center 21 about the center 20 and the roller 7 about the center 21 is a partial and reversible rotation, each with a fixed radius.

Figure 2:
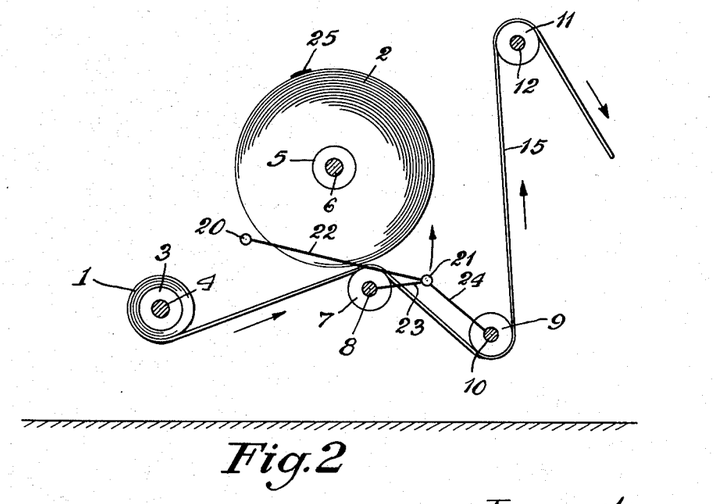
FIG. 2 is a view similar to that of FIG. 1 with the parts in position just prior to splicing of a second or replacement reel onto the moving web.

Referring now to FIG. 2, it will be observed that the amount of paper in the roll 1 is greatly reduced. As the end of the roll 1 is approached, the roller 7 is rotated about the center 21 in a clockwise or rearwardly, upwardly arcuate direction to bring it into close proximity to the perimeter of roll 2. Suitable mechanism is provided to produce this movement of the roller 7 and to create a pressure nip between the roller 7 and roll 2.

The numeral 25 in FIG. 2 designates a splice. As is well known, a splice is prepared by sealing the edge of the paper on roll 2 and by applying to the outer surface thereof, adjacent and paralleling the edge, a suitable layer of adhesive. As is further described below, the roll 2 and roller 7 are each rotated, their speeds of rotation being synchronized.

Figure 3:
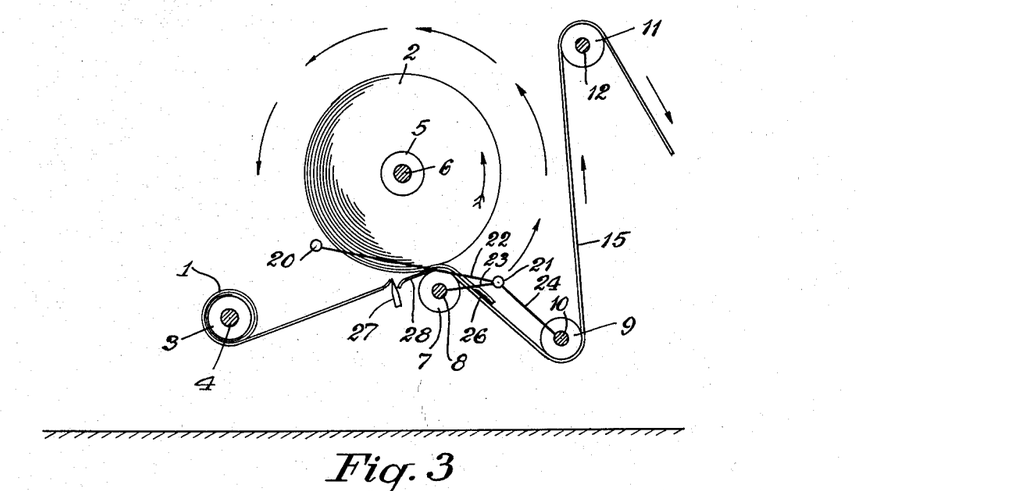
FIG. 3 is a view similar to that of FIG. 2 with the parts in position immediately following a splicing operation.

FIG. 3 illustrates the parts of my invention in the position immediately following the splicing operation. The splice of the paper from roll 2 onto the moving web 15 is indicated at 26. A suitable web-severing device, such as the knife shown diagrammatically at 27 in FIG. 3, is provided. I illustrate the knife 27 as positioned aft of the roller 7. As the parts are shown in the drawings, the knife 27 is advanced upwardly to sever the paper continuing to be fed from roll 1 through the nip between roller 7 and roll 2. The amount of the web which was fed originally from roll 1 and which remains after the severing operation, extending from the splice 26 to the knife 27, as illustrated in FIG. 3, is known as the tail or web tail and is designated at 28. While the knife 27 may be positioned in a variety of locations, I find it advantageous to position it aft of the roller 7 in order to insure against severing of the web being fed from roll 2 and to keep the web tail short.

Figure 4:
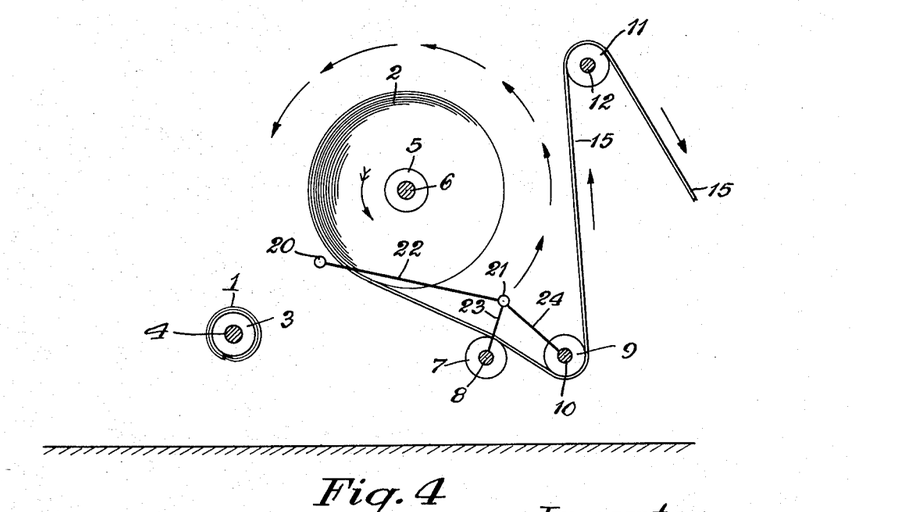
FIG. 4 is a view similar to that of FIG. 1 and illustrating the feeding of a web from a second reel.

FIG. 4 illustrates the web 15 being fed from the roll 2 with the pressure roller 7 and web-directing roller 9 in the normal position illustrated in FIG. 1.

Figure 5:
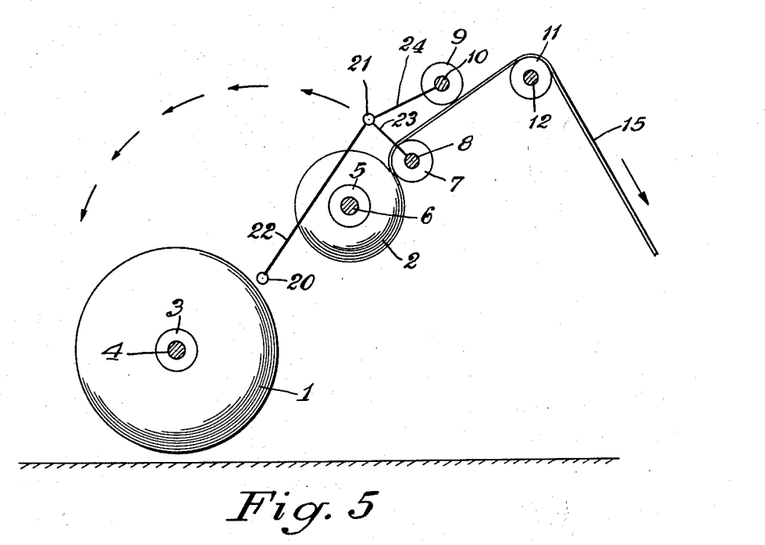
FIG. 5 is a view similar to that of FIG 4 and illustrating the parts in a position substantially midway between that illustrated in FIG. 4 and a position for splicing the first reel onto the moving web.

As the roll 2 diminishes, the splicing or web-positioning mechanism is advanced or traversed through its arc about the center 20, an initial portion of its travel being illustrated in FIG. 5. For purposes of schematic showing I illustrate an arm 22 extending from the center 20 to the center 21, an arm 23 extending from the center 21 to the shaft of the roller 7, and an arm 24 extending from the center 21 to the shaft of the roller 9. Thus the arm 22 serves as a radius of the arc of travel of the roller 7 when it is in its normal position with respect to roller 9, the roller 9 being fixed in relation to the center 21.

Figure 6:
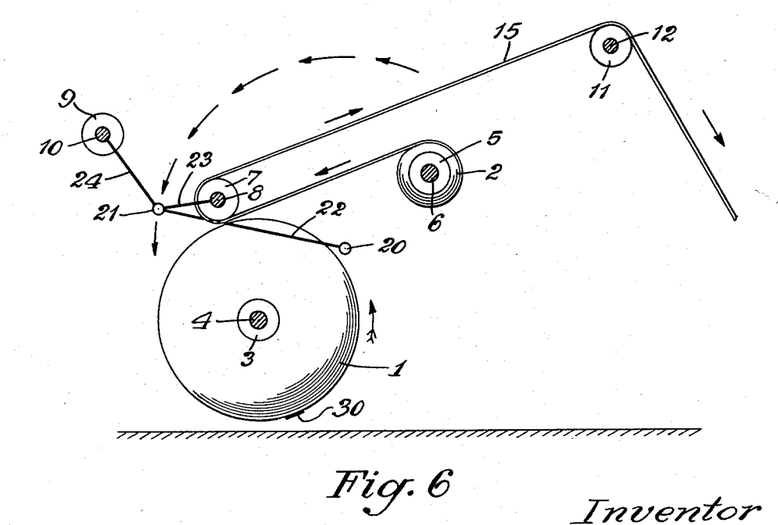
FIG. 6 is a view similar to that of FIG. 5 with the parts illustrated in position just prior to accomplishment of the splicing operation with respect to a replacement first reel.

FIG. 6 illustrates the web-positioning mechanism in position to accomplish a splice of a new roll 1 which has been placed in the position occupied by the roll 1 shown in FIG. 1. In order to reach this position the arm 22 had been rotated to the position shown and the arm 23 had been rotated about the center 21 to bring the pressure roller 7 into pressure- or splice-producing contact with the roll 1. A splice 30 is prepared on the roll 1 and is rotated into the pressure nip between the roller 7 and roll 1.

Figure 7:
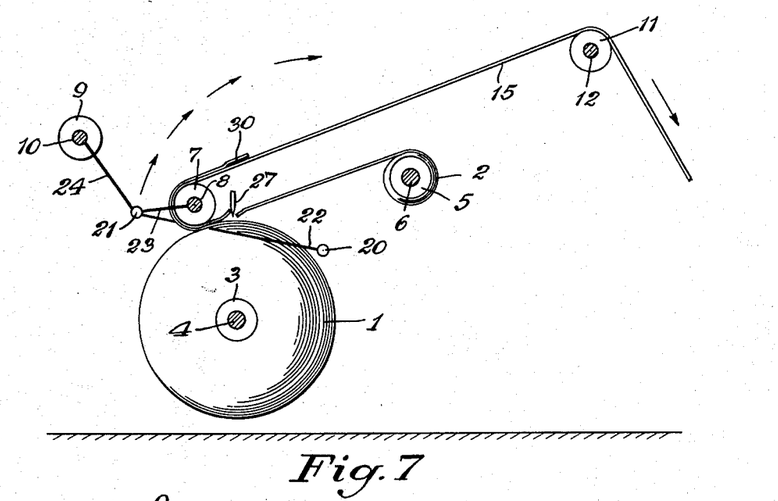
FIG. 7 is a view similar to that of FIG. 6 with the parts illustrated in position immediately following the splicing operation in relation to a replacement first reel.

FIG. 7 illustrates the action of the severing knife 27 which corresponds to the action described with reference to FIG. 3, above.

Figure 8:
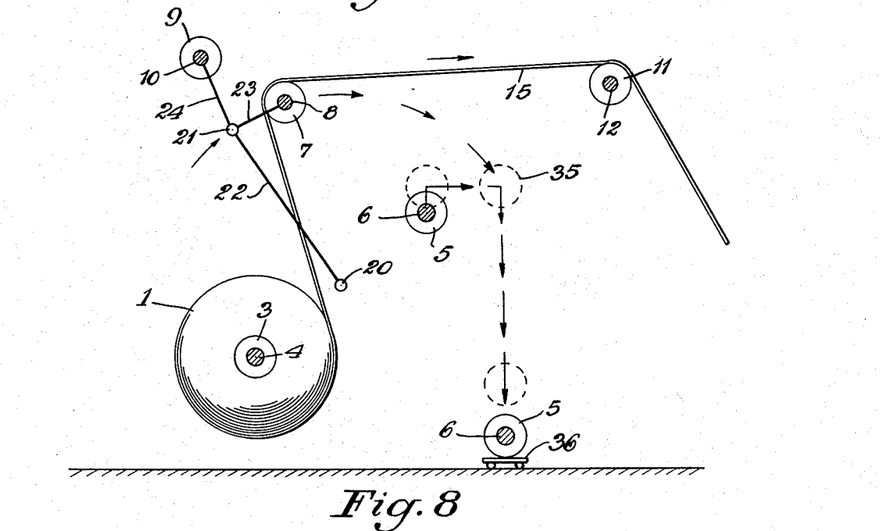
FIG. 8 is a view similar to that of FIG. 7 with the parts illustrated in an initial portion of the return movement from the position illustrated in FIG. 7.
Figure 9:
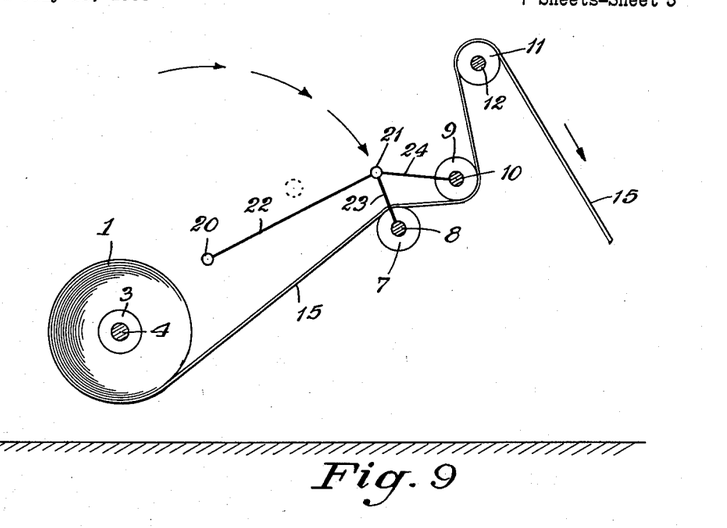
FIG. 9 is a view similar to that of FIG. 8 with the parts illustrated in a position of further travel toward a return to the position of FIG. 1.
Figure 10:
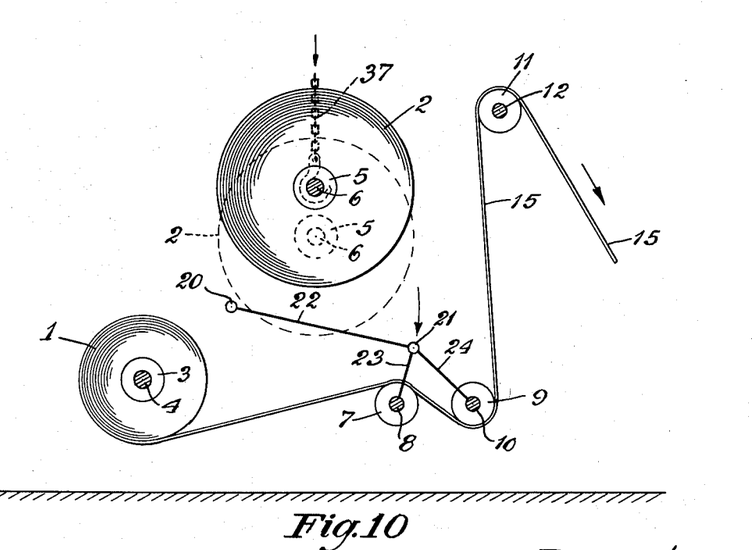
FIG. 10 is a view similar to that of FIG. 1 and illustrating the parts as fully returned from the position illustrated in FIG. 9, along with the installation of a replacement second reel.

FIGS. 8, 9 and 10 illustrate the return of the splicing mechanism to its normal position, or to the position illustrated in FIG. 1. As is illustrated the empty spool or spindle from which roll 2 has been unwound is removed from its support while the splicing mechanism is in the splicing position for roll 1 or while it is between the axis of rotation of roll 2 and that of roll 1. Where reels comprising shafts or cores are employed, it will be realized that the empty core or shaft must be removed, as indicated at 3, in order to permit return passage of the splicing mechanism with the moving roll to the normal position shown in FIG. 1. After the splicing mechanism and moving web have passed through the axis of rotation of roll 2, a new or replacement roll 2 may be easily and simply loaded into the roll 2 position, on appropriate supports. I illustrate in FIG. 10, for example, a hook and cable mechanism 37 effective to lower a new roll 2 into position for splicing onto the web 15 in the manner set forth with reference to FIGS. 1–4 and described above. The new roll 2 is shown in solid lines in FIG. 10 in an intermediate position and in dotted lines in its final or fixed position.

Figure 11:
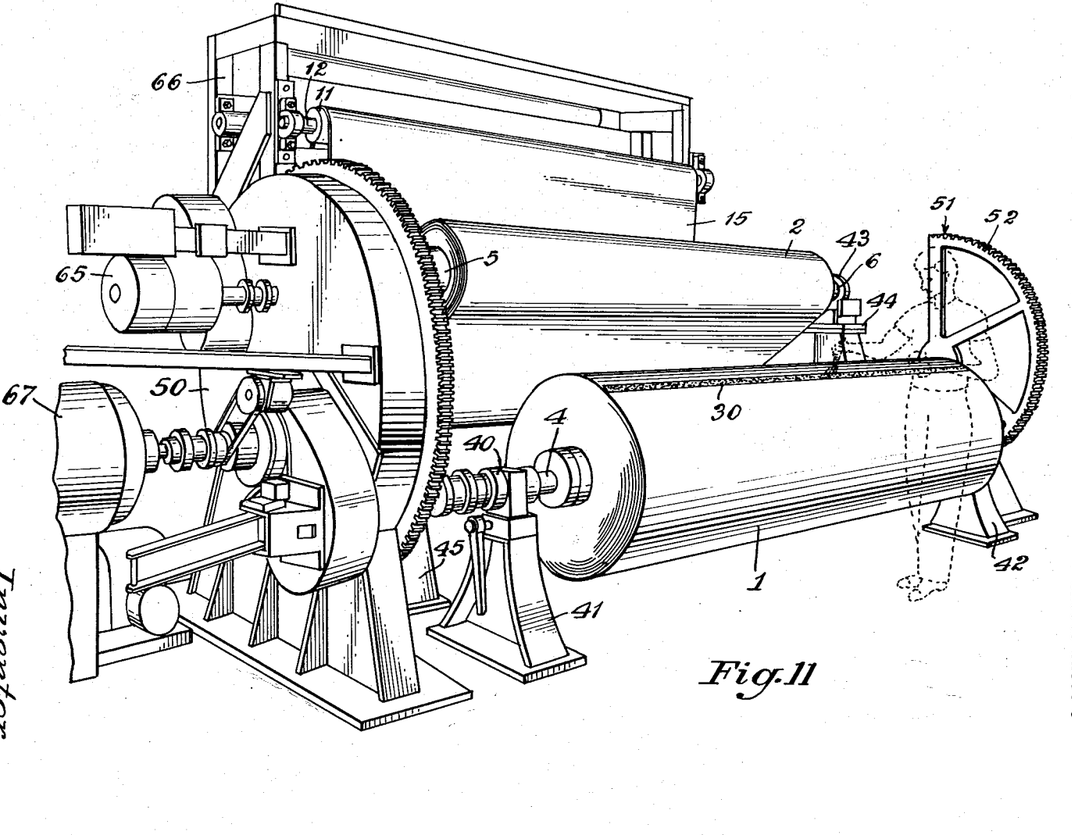
FIG. 11 is a perspective view illustrating the unwinder mechanism of my invention in one position.

Referring now to FIG. 11, I illustrate in perspective a view of my unwinder device in operation. The parts are shown in this view in a position similar to that shown diagrammatically in FIG. 4 with more of the paper unwound from roll 2 than that shown in FIG. 4. The shaft 4 of the fixed position roll 1 is shown as having its ends journaled in trunnions, as at 40, supported on spaced pedestals or supports 41, 42. The shaft 5 of fixed position roll 2 is shown as having its ends journaled in trunnions as at 43 supported on spaced pedestals or supports 44, 45. A roll-accelerating mechanism is illustrated generally at 50. An operator is shown in dotted lines as applying adhesive to roll 1 preparatory to the splicing operation. The motor 65 may be employed to selectively rotate or accelerate the rolls 1 and 2 to bring them up to web speed for splicing, it being understood that the web-processing machinery shown partially at 66 may serve to continue rotation of the feeding or active roll by pulling the web. 67 is a brake element.

Figure 12:
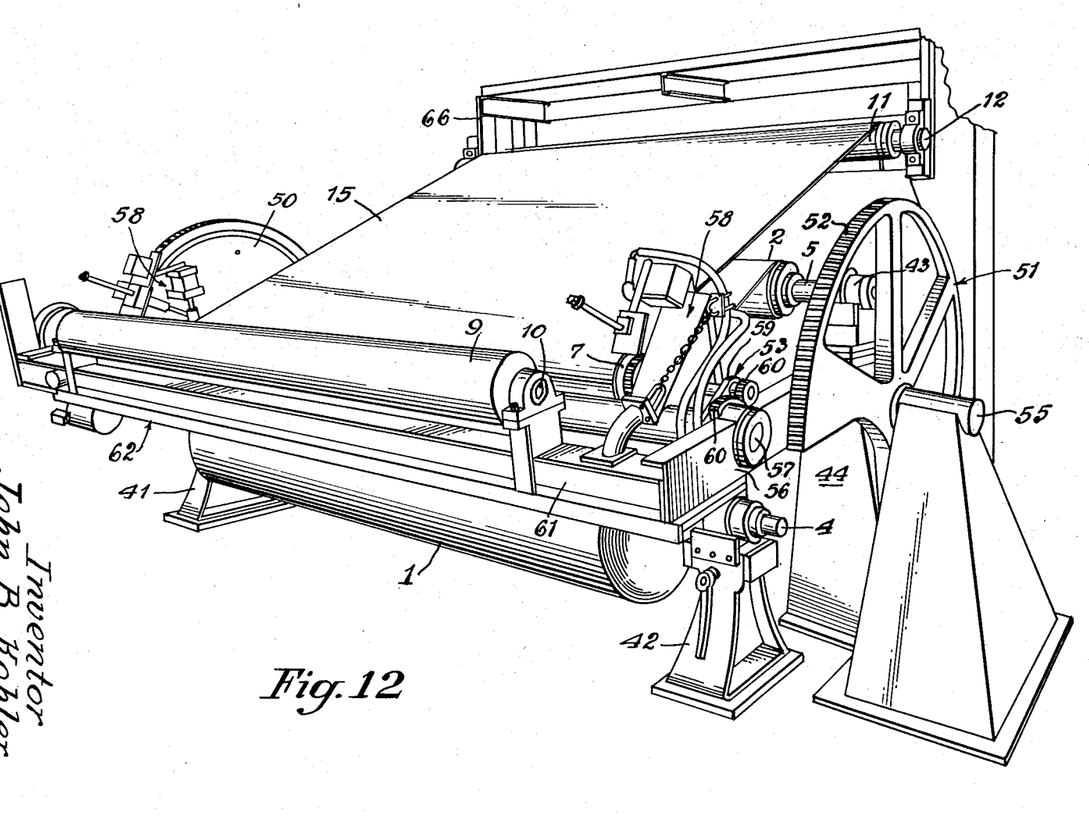
FIG. 12 is a perspective view illustrating the unwinder mechanism of my invention in another position.

Referring now to FIG. 12, I illustrate in perspective the device of FIG. 11 with the parts shown substantially in the position illustrated diagrammatically in FIGS. 6 and 7. A traversing mechanism indicated generally by numeral 51 is illustrated partially in FIG. 12 and is effective to traverse the splicing roller 7 and idler roller 9 through its arc about the center 20. While a partial gear 52 is illustrated as employed in the traversing mechanism, it will be realized that a variety of suitable devices may be employed for the purpose, without departing from the nature and scope of my invention. A positioning mechanism effective to position the splicing roller 7 with respect to the center 21 and with respect to the individual rolls 1, 2 is indicated generally by the numeral 53.

The stub shaft 55 of the partial gear member 51 may be considered as in alignment with the center 20. An arm rotatable about the center 20 by means of the mechanism 51, as indicated at 22 in FIGS. 1–10, is shown at 56 in FIG. 12. A bar 57 is mounted on the arm 56 in substantially the position of the center 21, shown diagrammatically in FIGS. 1–10. It will be understood that the bar 57 extends between and is connected to a pair of spaced arms 56, only the one arm 56 being shown in FIG. 12. A knife-advancing mechanism is shown at 58, the knife or severing element (not shown) extending between a pair of elements 58 fixed on the bar 57. It will be understood that the bar 57 may support, as by the ears 59, the splicing roller 7, the bar 57 being rotatable as by the gearing 60 to rotate the splicer roller 7 about the bar 57 or center 21.

The idler roller 9 is supported on a cross member 61 extending between and secured to the outer ends of the spaced arms 56. The side of the member 61 opposite that supporting the roller 9 and indicated generally by the numeral 62 in FIG. 12 constitutes, when the parts are in the position illustrated generally in FIG. 7, a walkway running along the forward face of the roll 2 and providing access by an operator to the roll 2 for the purpose of applying adhesive preparatory to the splicing operation.

Although I have shown an operative form of my device, the invention is not limited to the particular details shown. Many changes may be made in the form, shape and arrangement of parts without departing from the spirit of the invention.

The use and operation of my invention are as follows:

I provide an unwinder machine enabling the splicing of the replacement roll onto a moving web while the positions of the feeding and replacement rolls remain fixed, only the web being moved to effectuate the splicing operation. The substantial complexity and cost of apparatus necessary to move the very heavy reels involved is thus avoided. Similarly, I provide an unwinder mechanism capable of handling, with ease and simplicity, a roll containing breaks in the paper or material thereof.

A pair of fixed pedestals or back stands is provided for receiving or rotatably mounting reels such as paper machine reels. It will be understood that the rolls discussed herein may be considered "fixed position" rolls in the sense that the rolls are spliced onto the web fed to the processing machine without the necessity for moving the heavy rolls. It will be further understood that one feature of my invention is to accomplish this splicing operation while a web is continuously fed, without interruption, to the processing machinery. The term "fixed position" does not preclude, however, limited lateral movement of the reels or rolls on their fixed stands to provide for alignment and squaring up, the distinction lying in the fact that no bodily change of the position of the heavy rolls, such as by swinging or sliding to rearrange the relative positions of the expiring and the new roll and web is required.

The fixed stands are loaded generally by a crane or a hoist. If the mechanism of my invention were inverted this loading operation could, of course, be accomplished by a dolly or other means. In all events, however, the empty spool or core is removed from the opposite side of the web or underneath, as the parts are shown in the drawings submitted herewith. For this purpose a dolly 36 is illustrated schematically in the drawings.

The splicing or roll-changing mechanism of my invention includes a rubber covered pressure roller 7 resiliently and movably mounted, a web-directing roller and a web-severing device. The pressure or splicing roller may have bearings mounted in sliding ways in a pair of trunnion-mounted arms, such as the arms 56. The splicing roller bearings may be held against stops, for example by air cylinder pressure, to provide for adjustment, and may be varied according to the position or path of movement of the splicing roller. It will be understood that a variety of means, such as a brake motor acting through reduction gears, or a hydraulic cylinder, for example, may be employed to resiliently advance or move the roller to the active or splicing position and to retract it to a position in which it may be rotated about an expiring roll in the position of roll 2, while the web is continuing to be fed from the expiring roll 2. The primary consideration is that the roller 7 is resiliently mounted on a means movable to position the roller at desired points and to move it through a path effective to change the path of the moving web from the normal path shown in FIG. 1 to that shown in FIGS. 6 and 7 and back again to that shown in FIG. 1.

The web-severing device, such as the knife 27, may be operated by a variety of means, such as springs, air or hydraulic cylinders, etc. Similarly, solenoid-operated devices may be provided to release the knife for the cutting stroke in timed sequence or, where desired, simultaneously with the actual slicing action as the adhesive-covered portion of the new roll passes through the nip of the splicing roller and the roll to be spliced.

The web-advancing or web-positioning structure discussed above may be power operated by a brake motor with suitable gearing to cause it to be swung through an arc about a center, such as the center 20, midway between the centers of the active and expiring rolls. When the parts are in the position illustrated schematically in FIG. 1, and the web is being fed from roll 1, both fixed stands are accessible for loading with new rolls from above. When the web from roll 2 is to be spliced to a new or replacement roll 1 on the rearmost pedestals, the splicing or web-positioning mechanism described above is traversed or advanced to a position over the new roll 1, as shown in FIGS. 1–10. This action moves the web in an arc about the center 20 and passing around a substantial forward and upper portion of the roll 2. The empty core or spool comprising the reel for roll 2 is then removed from its supporting pedestals after the splice has been accomplished with respect to roll 1 and the expiring web from roll 2 has been severed and while the splicing mechanism remains in the last-described position. Thereafter the splicing mechanism is returned to the normal or FIG. 1 position and a new roll is loaded into the position of roll 2.

Since the web-positioning mechanism passes across or in front of the roll 2, suitable mechanism is provided for adjusting the position of the roller 7 to suit the varying diameter of the feeding or active roll 2. Similarly, the actuating mechanism for rotation of the pressure roller 7 about the center 21 is effective to provide for adjustment in creating the pressure nip between the roller 7 and a new roll, dependent upon the diameter of the new roll.

When a roll which contains a break or loose end of web is, for example, in the position of roll 1, the mechanism of my invention is effective nonetheless to handle the situation without stopping the treating process. In such event the roll 1, for example, will have been spliced into the moving web in the usual manner. Before the break is reached in the unwinding of roll 1, the web is spliced back to roll 2, as set forth above. While that roll is running out, the defective paper in roll 1 is removed from the roll while it remains in its fixed position and a new splice is prepared on it in the normal manner described above. When the paper or other material in roll 2 is about to expire, the web is then spliced back to the partial or remaining roll 1 in the manner set forth above.

Braking equipment is provided at each reel position and may comprise, for example, an eddy current brake with step-up gearing and means for connecting the same to the shafts of the reels. Similarly, a separate motor may be provided for accelerating the roll, which is about to be spliced, up to web speed. This motor may drive either of the reel shafts through one of two elective clutches mounted on step-up gear box output shafts. A variety of means may be provided for adjusting the speed of the roll accelerating motor, such as a synchronizing rheostat, or a mechanical drive contacting the surface of the new roll. Similarly, this synchronization may be automatic. For example, a differential selsyn system may provide an indication of the relative speed of the web and the new roll so that an operator may manually synchronize the web and roll speeds by adjusting the speed of the motor.

A footboard or walkway 62 may be carried by the splicing or web-positioning mechanism and may have its walk surface presented forwardly of the roll 2 when the parts are in the position shown schematically in FIG. 1 to permit access by an operator for preparation of the splice or adhesive layer on roll 2 while the web is continuing to be fed from roll 1.

Automatic timing of the splicing operation may be produced by a variety of mechanisms. I may, for example, employ a cam device in which a cam may turn with a roll shaft to trip and reset a limit switch or switches when the splice is, for example, in line with the splicing roller. Similarly, a set of sliprings and contacting brushes may be employed to provide an impulse operating relay to produce movement of the splicing roller and setting of rollers and roll speeds, in response to activation of a splice push button by the operator. For example, a first tripping of a switch may advance the pressure roller 7 to establish splicing pressure. One full revolution of the new roll may be allowed for this action to take place. A switch may then reset in the second half of this revolution, and a transition relay may change a set of circuits so that, upon the next tripping of the switch, the web-severing device is released in timed sequence or simultaneously with the passage of the layer of adhesive or splice through the nip of the pressure roller and the roll to be spliced.

It will be understood that certain modifications are possible without departing from the nature and scope of my invention. For example, the knife or web-severing device may be mounted on a fixed structure and may operate in a vertical line between the reel centers. Dual controls may be provided for cutting the web in both upper and lower locations. While I have shown reels with shafts and bearings, it will be understood that the reels may be mounted in arms individually adjustable for widths. Splicing roller resiliency and movement may be accomplished by the provision of counterbalanced flat springs with air cylinders to adjust pressure. A splicing roller may be positioned by hydraulic cylinders acting through a rack-and-pinion device. By the same token, roll or reel acceleration may be accomplished by a friction roller suitably driven by power from the processing machine to which the moving web is supplied and in frictional contact with the roll to be accelerated.

I claim:

1. The method of continuously feeding a longitudinally moving web to a web-treating machine which comprises the steps of positioning two rolls of web material adjacent said machine, rotating said rolls in the same direction, feeding a web from one of said rolls in a path by-passing the other of said rolls, applying to the other of said rolls a suitable adhesive, rotating said other roll at substantially the speed of said web, revising the path of said web to press said web into pressure-contact with said other roll while continuing the longitudinal movement of said web and the rotation of said other roll, rotating said adhesive into contact with said web, severing said web at a point aft of that contacted by said adhesive, positioning a new roll in the place of said first named roll, revising the path of said web in an arc about the rotational center of said other roll to cause it to pass said new roll at a point adjacent thereto, rotating said new roll at substantially the speed of said web, applying a suitable adhesive to said new roll, pressing said web into pressure contact with said new roll while continuing the longitudinal movement of said web, severing said web at a point aft of that contacted by said adhesive on said new roll, removing the remainder of said other roll, returning said web to its original path, placing another new roll in the place of said other roll and repeating the process thereafter.

2. In an unwinder device, a fixed support for a first reel, a fixed support for a second reel, a pressure roller movably and resiliently mounted for rotation about a fixed center into a pressure-establishing position with respect to a reel supported on said second support, and movably mounted for movement about a second center into pressure-establishing position with respect to a reel on said first support.

3. For use with a web-receiving machine, a fixed support for supporting a reel in alignment with said machine, a second fixed support in alignment with said first fixed support, a reel rotatably mounted on said first support and a reel rotatably mounted on said second support, rolls on said reels adapted to feed a web to said machine, and a pressure roller positioned on the side of said web opposite from that facing said reels, said roller being movable into one position to bring said web into pressure-contact with one of said rolls and into another position to bring said web into contact with the other of said rolls.

4. In a web roll feeding device, a first fixed roll support, a second roll support fixed adjacent said first support, means determining the path of a web running from a roll on either support, said means being movable to change the path of said web and to bring it into running pressure contact with the roll in the other support, means for accelerating said other roll, and web-severing means mounted for movement with said web path-determining means, said path determining means including a pressure roller mounted for constant contact with said web at all positions of said web, and means for moving said pressure roller past the center of rotation of the roll which is supported on said second support.

5. In a feed mechanism for web-treating machinery, a first fixed roll support, a second fixed roll support, a first roll rotatably mounted on said first support and a second roll rotatably mounted on said second support, the direction of rotation of the two rolls being the same, a splicing roller comprising means for guiding a web moving from either of said rolls, and means for moving said roller to press said web against each of said rolls alternately.

References Cited in the file of this patent

UNITED STATES PATENTS

| | | |
|---|---|---|
| 1,301,124 | Goss et al. | Apr. 22, 1919 |
| 1,305,429 | Wood | June 3, 1919 |
| 1,572,704 | Carpenter | Feb. 9, 1926 |
| 2,005,037 | Johancen et al. | June 18, 1935 |
| 2,196,612 | Scott | Apr. 9, 1940 |